March 18, 1969     K. SCHOLZEL     3,433,671
STORAGE BATTERY HAVING POSITIVE AND NEGATIVE
ELECTRODE IN DIRECT CONTACT
Filed June 22, 1966

3,433,671
STORAGE BATTERY HAVING POSITIVE AND
NEGATIVE ELECTRODE IN DIRECT CONTACT
Karl Scholzel, Bad Soden, Taunus, Germany, assignor to
Werner Greutert, Baden, Switzerland
Filed June 22, 1966, Ser. No. 559,517
Claims priority, application Switzerland, June 23, 1965,
8,836/65
U.S. Cl. 136—6     12 Claims
Int. Cl. H01m 43/00

The invention relates to a storage battery for the storage of electrical energy having at least one negative and at least one positive electrode and an electrolyte absorbed in the electrodes.

In all types of known storage batteries the negative electrode is separated in space from the positive electrode. In storage batteries of the conventional open model, the electrodes are immersed, at a more or less great distance from each other, in an electrolyte liquid, usually sulfuric acid or potash lye.

In the known hermetically sealed storage batteries, the negative electrode is usually quite close to the positive electrode and is separated from it in space by a so-called separator. This separator consists of a porous, electrically nonconducting material, e.g., a plastic fabric or web, which is wetted with electrolyte liquid, preferably potash lye, and which should be as nearly as possible impermeable to gas bubbles. This separator does not itself participate in the electrochemical reactions of the storage battery. It does, however, prevent a short-circuit due to contact of metal parts of opposite polarity, but at the same time it increases the internal resistance and renders material exchange in the storage battery difficult.

The invention contemplates the provision of a storage battery in which the conventional separator is eliminated while retaining its function. Compared with electrodes arranged at relatively great spacing, the separator had originally achieved the advantage of small spatial dimensions and low internal resistance, because by insertion of this separator the electrodes could be brought much closer together.

According to the invention, the metallic supporting framework of at least one electrode is covered with active mass on the side facing its electrode of opposite polarity and touches the other electrode with at least a portion of its surface.

Under these conditions a separator can be dispensed with.

Advantageously the electrodes are in contact on the entire surface facing one another.

An advantage of the invention is that by elimination of a special separator and by direct contact of the electrodes, a minimum of space is required and a minimum internal electric resistance is attained. Moreover, evolution of gas causing internal overpressure in the battery cell is suppressed.

The construction and operation of an embodiment of a storage battery according to the invention will next be described with reference to the attached drawing, wherein.

Figure 1:
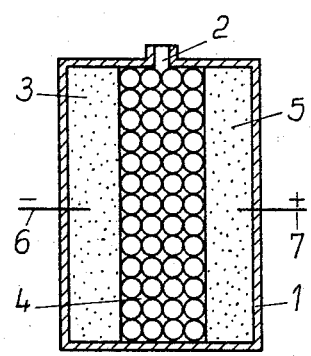
FIGURE 1 is a schematic sectional view of a storage battery according to the invention in the discharged state.

FIG. 1 shows the storage battery in the discharged state. The storage battery comprises a housing 1 having an aperture 2 which may be hermetically sealable. In the housing is a negative electrode consisting of two layers 3 and 4 disposed adjacent a positive electrode 5, directly, without any separating layer. The layers 3, 4 and 5 are impregnated with electrolyte solution such as potash lye.

Insulated connections 6 and 7 extend through the housing wall 1 for connection in an external circuit for the charging and discharging of the storage battery.

Layer 3 of the negative electrode consists of a porous metallic supporting framework, for example, a highly porous nickel sinter framework, in which a portion of an active mass, e.g., cadmium hydroxide, is embedded.

In layer 4, which in the discharged state of the storage battery does not contain any metal, there is housed the remaining portion of the active mass of the negative electrode, i.e., cadmium hydroxide in the form of loose or pressed powder, possibly mixed with a bonding agent for the mechanical fixation on the supporting framework 3.

The positive electrode 5 may also consist of a porous metallic supporting framework, in the cavities of which are embedded a positive electrode mass, such as nickel-II-oxide or hydroxide. The positive electrode 5 may also be formed without a metallic supporting framework and may consist for example of pressed nickel oxide powder, with which nickel powder or graphite may be admixed to increase the conductivity.

According to FIG. 1, upon charging, the cadmium hydroxide contained in the pores of the sinter framework 3 of the storage battery is transformed into metallic cadmium, while in the positive electrode 5 an equivalent amount of nickel-II-oxide is oxidized to a higher valence degree.

Layer 4 does not at first undergo any change. Only after all the cadimium hydroxide in the supporting framework 3 has been reduced to metallic cadmium, is the cadmium hydroxide in layer 4 transformed into metallic cadmium. The reduction first begins at the interface between layers 3 and 4 and after nearly all the cadmium hydroxide thereat has been transformed into cadmium, the reduction proceeds in the direction of the positive electrode 5. The reduced zone of layer 4 is metallically conducting.

Figure 2:
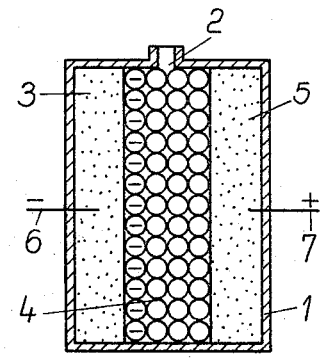
FIGURE 2 shows the storage battery in a first state of incomplete charge.

This state is indicated in FIG. 2. Layer 4 of the negative electrode consists of a portion of metallic cadmium powder, and of a portion which is still nonconducting cadmium hydroxide. The particles of active mass are indicated schematically in FIG. 2 by small circles, which in the charged state as a carrier of negative charge are provided with horizontal lines.

If charging of the storage battery is continued, the cadmium hydroxide which is in direct contact with the positive electrode 5 is reduced to cadmium. This state presupposes that the capacity of the positive electrode is at least as great as that of the negative electrode.

Figure 4:
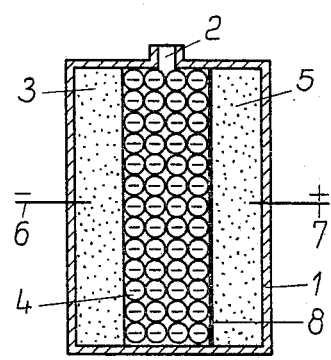
FIGURE 4 shows the storage battery in a completely charged state.

This state is illustrated in FIG. 4. Here a short-circuit forms between the negative and the positive electrode at the interface 8, the current strength successively increasing at constant charging voltage as more cadmium hydroxide is reduced at the interface 8.

This substantial increase of the current strength is an indication that the storage battery is completely charged.

When a certain limit current strength, adjustable at will, is exceeded, the charging of the storage battery can be terminated by automatic breaking of the supply circuit in a known manner, as for example, by an automatic fuse installed in the circuit. Thereby a special advantage is achieved in that a continuous overcharge required in the known storage battery types for the attainment of a full charge is eliminated. Thereby there is avoided unnecessary energy expenditure and the evolution of gas as well as internal overpressure possibly caused thereby.

After interruption of the charging current, the particles of opposite charge in contact at the interface 8 are neutralized. The metallically conducting cadmium is then immediately oxidized to nonconducting cadmium hydroxide and in this way the internal short-circuit is automatically eliminated.

Figure 3:
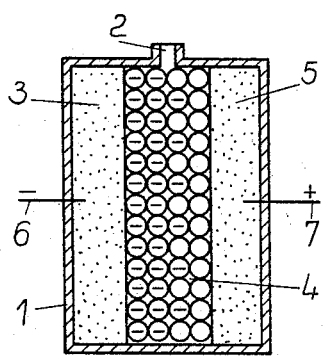
FIGURE 3 shows the storage battery in a second, advanced, but also still incomplete state of charge.

Under the conditions described, therefore, the active mass of the storage battery forms an automatically operating separating layer of uncharged mass particles, which is indicated in FIG. 3 by the empty circles.

The advantages of the storage battery according to the invention which eliminates the special separators reside primarily in its low internal resistance, its higher capacity per unit of weight or volume, and in the easy possibility of automatically cutting off the charging current after a state of complete charge has been reached.

In further accordance with the invention the positive electrode 5 can also be constituted by two layers analogous to the example stated, if its active mass does not conduct electric current in the discharged state.

The formation of a short-circuit bridge between the eelctrode frameworks 3 and 5 after reaching the state of complete charge is, however, possible only if the active mass of the positive electrode conducts current in the charged state.

For example, the inckel oxide of the higher valence degree, as it is present in the charged nickel-cadmium storage battery, possesses the properties of a semiconductor and conducts electric current much better than the oxide of the lower valence degree, as it is present in the discharged state of the storage battery.

Also in the lead storage battery, the lead dioxide of the positive electrode conducts electric current much better than the lead sulfate resulting therefrom during discharge.

On the other hand, the described construction of the positive electrode in two layers cannot be effected with silver or silver compounds, because the silver present in the discharged state of the storage battery conducts electric current much better than, for example, the silver oxide present in the charged state.

Furthermore, both electrodes may be in the form of two layers as described. In this case a short-circuit is brought about after complete charging only if the capacities of both electrodes are the same.

In further accordance with the invention, interval short-circuiting can be avoided by providing that the electrode presenting the separating layer 4 has a greater capacity than the electrode of opposite polarity. Thereby there is obtained a storage battery which is overchargeable in known manner. If, for example, the negative electrode, which is provided with a separating layer 4 according to FIGS. 1–3, has a greater capacity than the positive electrode, there evolves at the latter, after complete charging of the storage battery, gaseous oxygen, which re-oxidizes an equivalent quantity of active mass of the negative electrode. Consequently, the reduction in the separating layer 4 does not continue even upon further passage of charging current and therefore cannot be completed to form a short-circuit.

Instead of cadmium hydroxide or nickel oxide, the electrodes may contain other chemical substances as active mass, such as zinc, iron, and other base metals or their compounds in the negative electrode, and for instance, silver, copper, cobalt, mercury and other metals or their compounds in the positive electrode.

The application of the inventive concept is not limited to storage batteries with alkaline hydroxide solutions as electrolyte, but is suitable also for the lead storage battery.

The described construction is particularly advantageous for hermetically sealed storage batteries, since after complete charging the further supply of current no longer produces evolution of gas (as is the case in previously known storage batteries due to decomposition of the electrolyte solution) but rather brings about an internal short-circuit, by means of which the charging process can easily be interrupted.

The storage battery according to the invention is therefore especially well suited for rapid charges, where the current strength may be about 5 to 20 C, wherein C represents the capacity of the storage battery in ampere-hours divided by the unit of time.

To obtain storage batteries of highest possible capacity, the negative electrode contains an approximately equivalent quantity of active substance as in the positive electrode.

To insure reliable operation of the described storage battery, it is advantageous to arrange the electrodes substantially parallel to each other, and to provide the metallic carrier plate with as uniform as possible a plane surface. Protruding corners and edges produce an increased current density thereat resulting in a mushroom type growth of a metallic bridge in layer 4 between the electrode frameworks 3 and 5, leading to a premature short-circuit before the active mass in zone 4 is substantially completely reduced.

To avoid this phenomenon, the uniform propagation of the reduction zone in layer 4 can be favorably influenced by the addition of so-called lustering agents and the like as used in electroplating for the deposition of metal coatings as plane and smooth as possible. Their diversity is very great. As preferred agents there may be mentioned: glycerin, boric acid, silicates, phosphates, gelatins, coumarin, and the like.

The invention may be modified in that the portion of one electrode facing the other electrode is formed as separator filled or impregnated with active mass and mounted on the surface of this electrode.

To influence the rate of displacement and stability of the boundary layer, addition of bonding and/or filling agent may be made in the active mass.

In a further form of the invention, the electrode releasing the short-circuit upon attainment of the state of complete charge may advantageously be composed of two or more electrically active components in layers. The functioning of a two-component electrode will be further explained with reference to the following example.

The compound such as a hydroxide, of a metal A is embedded in the interior, e.g., in a sinter framework, of the discharged negative electrode 3, while the compound of a base metal B forms an external layer 4, which connects at least partly the sinter framework and the active compound of metal A contained therein directly with the positive electrode 5. The positive electrode may contain, for example, nickel hydroxide as active mass, and the electrolyte surrounding both electrodes jointly may be an aqueous solution of potassium hydroxide.

Upon charging of the storage battery, first the hydroxide of the more precious metal A is reduced, until the hydroxide is completely transformed into pure metal. Upon continued charging, the compound of the base metal B, which may be also a hydroxide, is reduced, so that the previously electrically nonconducting layer 4 lying between the negative electrode core and the positive electrode now forms a metallic, electrically conducting bridge, similar to interface 8 in FIG. 4, which short-circuits the charging circuit in the interior of the storage battery thereby enabling the possible automatic opening of the charging circuit. The short-circuit briefly existing between the negative and the positive electrode causes a partial oxidation of the active mass B and an equivalent reduction of the active mass of the positive electrode. This results in the formation of the electrically nonconducting starting compound from metal B, due to which the short-circuit is eliminated again before metal A and the balance of B can be oxidized by internal self-discharge. The nonconducting layer, consisting of the compound of metal B, subsequently acts as a separator, until after another complete charge of the storage battery, at which time the metal B again forms the short-circuit bridge.

The advantage of the negative electrode composed of two components is that metal A cannot be oxidized, for example, by internal self-discharge, until metal B is completely oxidized in entirety. Thereby a uniform growth of the short-circuiting metal layer B is obtained upon overcharge of the storage battery only after complete conversion of the active mass A in layer 3, while a uniform reformation of the insulating layer consisting of compound B, resulting after interruption of the charging current or upon subsequent discharge of the storage battery, is insured even through many charge-discharge cycles.

If, for example, if metal A is cadmium, metal B can suitably be iron to obtain the described effect quite well. In principle metals such as zinc, aluminum, beryllium and others are suitable for the purpose, although their solubility in alkaline electrolytes restricts their use as compared with nonamphotetic metals. Also some metals of Group III of the Periodic Table, in particular of the rare earths, can be used.

With nonaqueous electrolytes, which contain, for example, pyridine, alcohols, or other anhydrous liquids as solvents, base metals, such as magnesium, aluminum, alkaline or earth alkaline metals, can perform the function of metal B.

Numerous modifications and variations of the disclosed invention will now become apparent to those skilled in the art without departing from the scope and spirit of the invention as defined in the attached claims.

I claim:

1. A storage battery for the storage of electrical energy comprising at least one negative and at least one positive electrode and an electrolyte absorbed in the electrodes, at least one of said electrodes including a metallic supporting framework containing active mass, and a coating of said active mass on a side of said framework facing the other electrode of opposite polarity, said coating being of sufficient thickness to be in direct contact without any separating layer with said other electrode with at least a portion of its surface.

2. A storage battery according to claim 1, wherein at least one of the electrodes is composed of at least two layers, one of which contains said metallically conducting framework into which active mass is embedded, while the other layer is directly contiguous with the other electrode of opposite polarity and contains at least predominantly the same active mass.

3. A storage battery according to claim 1, comprising a lustering agent added to the active mass or the electrolyte for the production of a uniformly increasing metallic layer in said coating upon charging of the battery.

4. A storage battery according to claim 3, wherein said lustering agent is glycerin, boric acid, silicate, phosphate, gelatin or coumarin.

5. A storage battery according to claim 1 comprising a bonding or filling agent in said active mass.

6. A storage battery according to claim 1, wherein said electrodes have substantially the same capacity, the thickness of said active mass coating being sufficient to form in the partially or completely discharged state of the storage battery a nonconducting separating layer between the electrodes, said coating, after complete charging, and upon further passage of charging current, becoming a metallically conducting bridge and, after interruption of the charging current, automatically forming a nonconducting separating layer again.

7. A storage battery according to claim 6, wherein said one electrode is the positive electrode.

8. A storage battery according to claim 6, wherein said one electrode is the negative electrode.

9. A storage battery according to claim 1, wherein the capacity of said one electrode is greater than that of the other electrode.

10. A storage battery according to claim 1, comprising a hermetically sealable casing for the electrodes and electrolyte.

11. A storage battery according to claim 1, having a charging rate of 5–20 C, wherein C represents the capacity of the storage battery in ampere-hours divided by the unit of time.

12. A storage battery according to claim 1, wherein said one electrode is the negative electrode having an active mass of metal A, said coating being an electrochemically active layer consisting of the active mass of a base metal B surrounding the framework of metal A, so that upon incipient overcharge of the completely charged storage battery, metal B forms at least partially between the framework of the negative electrode and the positive electrode an electrically conducting bridge, whereas upon incipient discharge the the storage battery an electrically nonconducting separating layer consisting of a compound of metal B, is formed from metal B.

References Cited
UNITED STATES PATENTS

| | | | |
|---|---|---|---|
| 2,001,978 | 5/1935 | Ruben | 136—83 |
| 2,905,740 | 9/1959 | Smyth et al. | 136—83 |
| 3,073,884 | 1/1963 | Pinkerton | 136—100 |

WINSTON A. DOUGLAS, *Primary Examiner.*

A. SKAPARS, *Assistant Examiner.*

U.S. Cl. X.R.

136—143